(12) United States Patent
Nagano et al.

(10) Patent No.: US 6,556,039 B2
(45) Date of Patent: Apr. 29, 2003

(54) IMPEDANCE ADJUSTMENT CIRCUIT

(75) Inventors: Hideo Nagano, Tokyo (JP); Takahiro Miki, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/962,191

(22) Filed: Sep. 26, 2001

(65) Prior Publication Data

US 2002/0175700 A1 Nov. 28, 2002

(30) Foreign Application Priority Data

May 11, 2001 (JP) ........................................ 2001-142189

(51) Int. Cl.[7] .............................................. H03K 17/14
(52) U.S. Cl. ............................. 326/30; 326/32; 326/34
(58) Field of Search ................................. 326/30–34, 86, 326/90, 82, 83

(56) References Cited

U.S. PATENT DOCUMENTS 5,726,582 A * 3/1998 Hedberg ...................... 326/30
6,288,564 B1 * 9/2001 Hedberg ...................... 326/30
6,414,512 B1 * 7/2002 Moyer ......................... 326/30

FOREIGN PATENT DOCUMENTS

| JP | 7-202674 | 8/1995 |
|----|----------|--------|
| TW | 409482   | 10/2000 |

* cited by examiner

*Primary Examiner*—Michael Tokar
*Assistant Examiner*—Anh Q. Tran
(74) *Attorney, Agent, or Firm*—Leydig, Voit & Mayer, Ltd.

(57) ABSTRACT

An impedance adjustment circuit achieves impedance matching between a terminal resistor in a reception-side semiconductor device and a transmission line. A reference resistor has a first resistance proportional to characteristic impedance of the transmission line. This reference resistor is external to the reception-side semiconductor device. Furthermore, the terminal resistor includes a resistor having a second resistance and an ON resistance of an MOS transistor. The resistance of the terminal resistor is adjusted by referring to the reference resistor.

8 Claims, 9 Drawing Sheets

| WHEN DIFFERENTIAL COMMON VOLTAGE>Vc | I(2)>I(3) | I(4)'/2>I(3)" | I(5)<I(4) | V(8) INCREASES (Vgs LOW) |
|---|---|---|---|---|
| WHEN DIFFERENTIAL COMMON VOLTAGE=Vc | I(2)=I(3) | I(4)'/2=I(3)" | I(5)=I(4) | V(8) |
| WHEN DIFFERENTIAL COMMON VOLTAGE<Vc | I(2)<I(3) | I(4)'/2<I(3)" | I(5)>I(4) | V(8) DECREASES (Vgs HIGH) |

IMPEDANCE ADJUSTMENT CIRCUIT

FIELD OF THE INVENTION

The present invention relates to an impedance adjustment circuit which can adjust an input impedance on a data reception side of a data transmission system having a plurality of data transmission channels. More particularly, this invention relates to an impedance adjustment circuit which is frequently used in a differential output circuit for TMDS (Transmission Minimized Differential Signaling).

BACKGROUND OF THE INVENTION

The configuration of a conventional data transmission system for adjusting an input impedance on a data reception side is shown in FIG. 10. In general, when propagation delay times of a transmission line is longer at the leading edge of a signal than at the trailing edge of the signal, the transmission line is treated as a distributed constant line. In this case, it is necessary to considered the influence of noise generated due to reflections or the like.

FIG. 11 is a diagram showing the configuration of a data transmission system which suppresses reflections. In order to obtain impedance matching, for example, a termination resistor is used as illustrated in FIG. 11. When there is a match between the output impedance (Z1) of the transmission-side device, characteristic impedance (Z0) of the transmission line, and termination resistance (ZL), reflections should not occur.

However, in the conventional data transmission system, data buses of a transmission-side device and a reception-side device are frequently constituted by multi-bit buses such as 8-bit buses or 16-bit buses. For this reason, termination resistors are added to all the input terminals of the reception-side device. As a result, the number of elements on the substrate disadvantageously increases. Thus, cost of the system increases, and mounting area on the substrate increases.

On the other hand, when termination resistors are incorporated in the reception-side device to solve the above problem, the resistors incorporated in the device generally vary in manufacture. For this reason, impedance mismatching caused by the variations in manufacture occurs disadvantageously. In this case, since the resistances have specific values, a problem that this device cannot be used in systems having different characteristic impedances of transmission lines is posed.

SUMMARY OF THE INVENTION

It is an object of this invention to obtain an impedance adjustment circuit which can absorb the variations of internal resisters in manufacture even though terminal resistors are incorporated in a reception-side device and which can realize optimum impedance matching.

The impedance adjustment circuit according to one aspect of this invention comprises a reception-side semiconductor device including at least a terminal resister, the impedance adjustment circuit achieving impedance matching between the terminal resister and a transmission line; and a reference resistor provided externally to the reception-side semiconductor device, the reference resistor having a first resistance which is in proportion to an impedance of the transmission line. The terminal resistor is constituted by a resistor having a second resistance and an ON resistor of a MOS transistor. Resistance of the terminal resistor is adjusted by referring to the reference resistor.

The impedance adjustment circuit according to another aspect of this invention comprises a reception-side semiconductor device including at least a terminal resister, the impedance adjustment circuit achieving impedance matching between the terminal resister and a transmission line; and a reference resistor provided externally to the reception-side semiconductor device, the reference resistor having a first resistance which is in proportion to an impedance of the transmission line. The terminal resistor is constituted by an ON resistor of a MOS transistor. Resistance of the terminal resistor is adjusted by referring to the reference resistor.

Other objects and features of this invention will become apparent from the following description with reference to the accompanying drawings.

DESCRIPTION OF THE PREFERRED EMBODIMENTS

Embodiments of an impedance adjustment circuit according to the present invention will be described below with reference to the accompanying drawings. The present invention is not limited to these embodiments.

Figure 1:
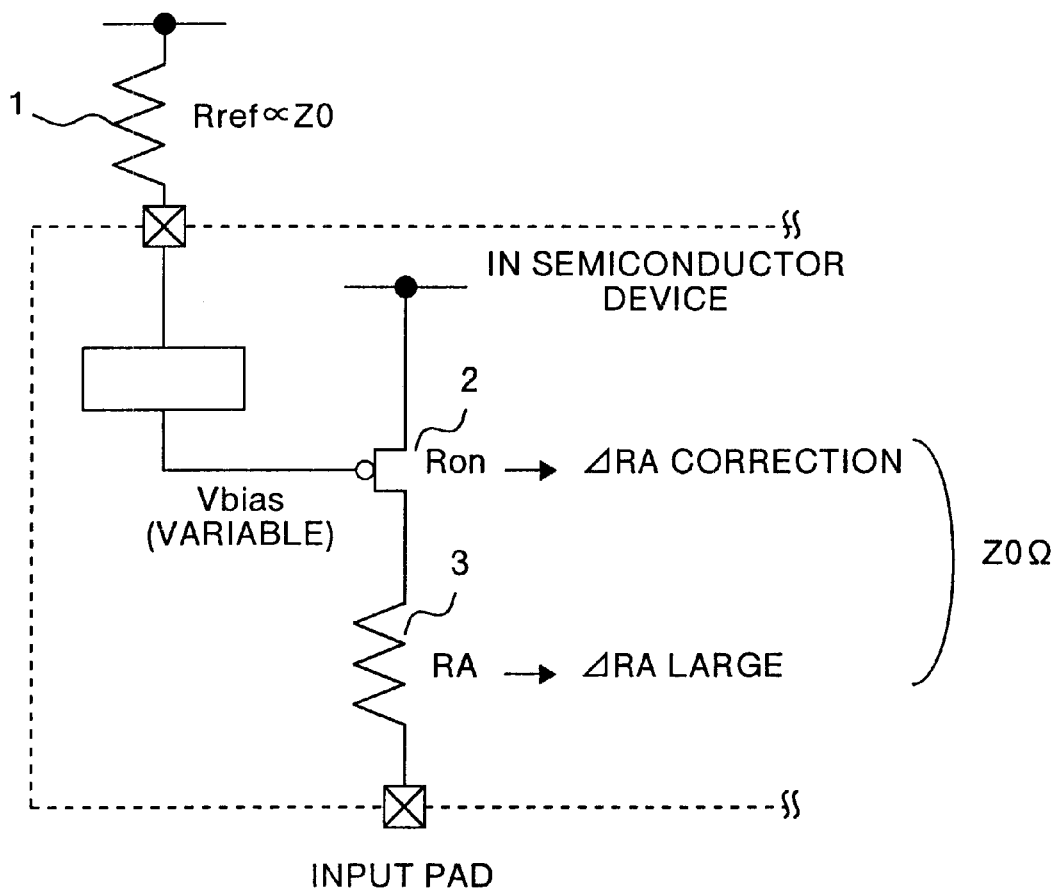
FIG. 1 is a block diagram showing the concept of an impedance adjustment circuit according to the present invention.

FIG. 1 is a block diagram showing the concept of an impedance adjustment circuit according to the present invention. Reference numeral denotes a reference resistor additionally attached to a semiconductor device, reference numeral 2 denotes a MOS transistor incorporated in the semiconductor device, and reference numeral 3 denotes a resistor incorporated in the semiconductor device.

In general, when terminal resistors are incorporated in semiconductor devices, the resistances of the terminal resistors are varied by the variations of the resistors in manufacture. Accordingly, mismatching of characteristic impedances occurs. Even though an output impedance of a transmission-side semiconductor device, a characteristic impedance (Z0) of a transmission line, and a terminal resistor of a reception-side semiconductor device are matched to each other, when the characteristic impedance of the transmission line changes, the semiconductor devices cannot be used.

In the present invention, the reference resistor 1 having a resistance Rref which is in proportion to the impedance to the transmission line is additionally attached to the reception-side semiconductor device. More specifically, the reference resistor 1 and the internal terminal resistor are matched to each other.

In order to suppress the variation of the resistor 3, it is assumed that the terminal resistor is constituted by the resistor 3 having a resistance RA and an ON resistor (resistance Ron) of the MOS transistor 2. More specifically, when the terminal resistor is constituted by the resistor 3, the variation of the resistance in manufacture is large. For this reason, the terminal resistor is designed such that the variation is absorbed by the ON resistor of the MOS transistor 2.

Figure 2:
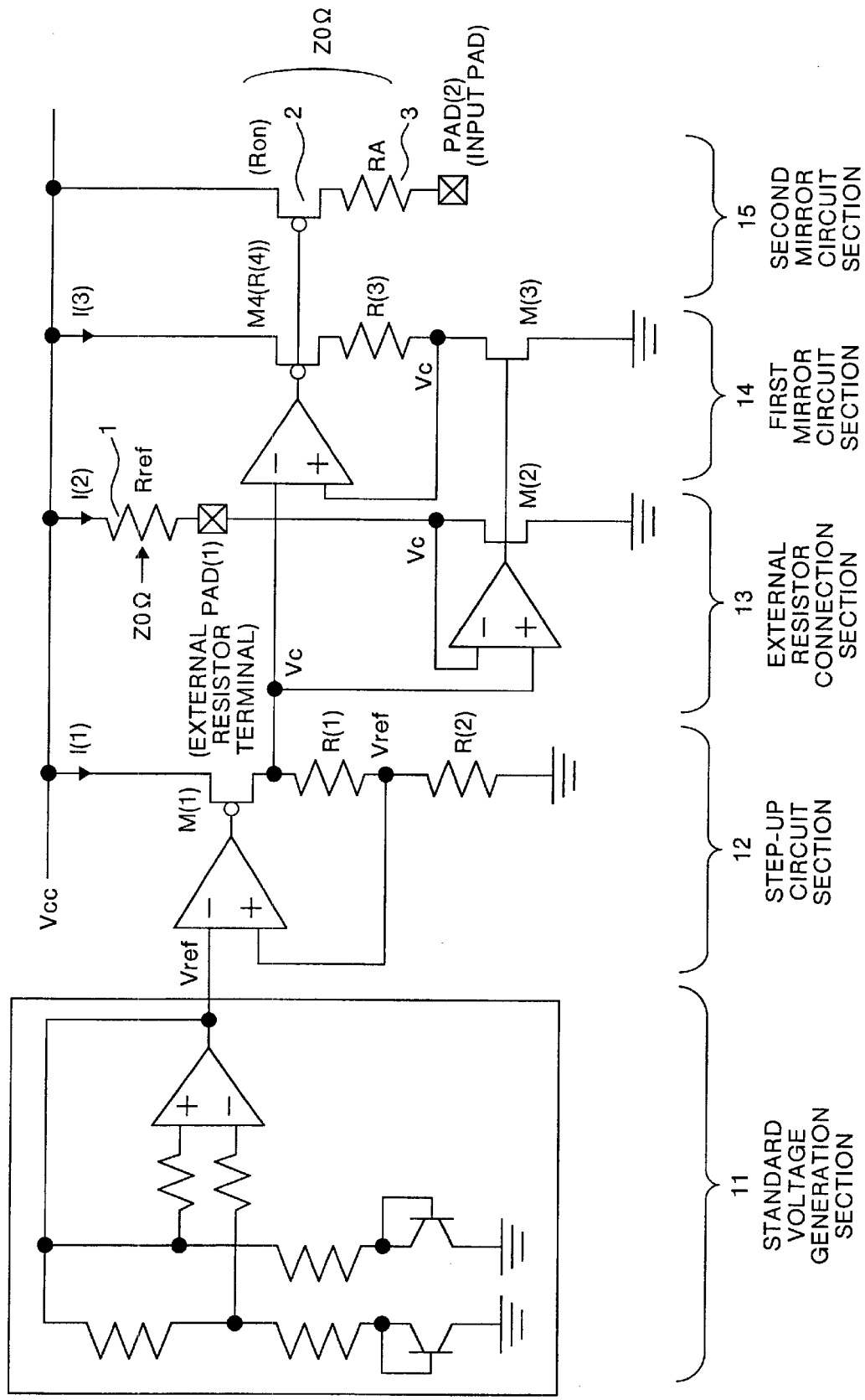
FIG. 2 is a block diagram showing the configuration of a first embodiment of the impedance adjustment circuit according to the present invention.

FIG. 2 is a block diagram showing the configuration of a first embodiment of the impedance adjustment circuit according to the present invention. Reference numeral 11 denotes a reference voltage generation section, reference numeral 12 denotes a step-up circuit section, reference numeral 13 denotes an external resistor connection section, reference numeral 14 denotes a first mirror circuit section, and reference numeral 15 denotes a second mirror circuit section.

Operation of the impedance adjustment circuit will be described below. In the reference voltage generation section 11, even though a variation in power supply voltage, a variation in temperature, and a variation in manufacture occur, an operation is performed such that an almost constant reference voltage Vref can be obtained. In general, a band gap reference circuit is applied.

In the step-up circuit section 12, a standard voltage Vc (>Vref) is generated by using a reference voltage Vref of an output from the reference voltage generation section 11. In this case, the increased standard voltage Vc is set to be a central voltage (common potential in a differential signal) of a transmission signal amplitude. More specifically, due to the negative feedback principle of an operational amplifier, a connection-point voltage between a resistor having a resistance R(1) and a resistor having a resistance R(2) is equal to the reference voltage Vref. For this reason, when a current flowing in a MOS transistor M(1) is represented by I(1), the standard voltage Vc is expressed by equation (1):

$$Vc = Vref + I(1) \times R(1) \qquad (1)$$
$$= Vref + Verf/R(2) \times R(1)$$

This embodiment illustrates a case in which the central voltage of the transmission signal amplitude is higher than the reference voltage Vref.

In this manner, the standard voltage Vc can be calculated by a ratio of the reference voltage Vref, the resistance R(1), and the resistance R(2). In the semiconductor device, since elements having the same shapes and adjacently arranged in the semiconductor device have almost equal characteristics, as is apparent from equation (1), the standard voltage Vc can be accurately determined like the reference voltage Vref without being influenced by a variation in power supply voltage, a variation in temperature, and a variation in manufacture.

In the external resistor connection section 13, due to the negative feedback principle of the operational amplifier, a terminal PAD(1) is biased to the standard voltage Vc. Therefore, a current I(2) flowing in a MOS transistor M(2) is expressed by equation (2):

$$I/(2)=(Vcc-Vc)/Rref \qquad (2)$$

where Vcc denotes a power supply voltage. The resistance Rref=Z0 (reference resistor 1) represents a value which is in proportion to the impedance of the transmission line as described above.

In the first mirror circuit section 14, a voltage equal to the gate voltage of the MOS transistor M(2) is set to be a gate voltage of a MOS transistor M(3), and the MOS transistor M(3) is biased to a saturation region, so that a current I(3) flowing in the MOS transistor M(3) is equal to the current I(2).

The drain voltage of the MOS transistor M(3) is equal to the standard voltage Vc due to the negative feedback principle of the operational amplifier. Furthermore, since a resistance RB between the power supply voltage Vcc and the drain voltage of the MOS transistor M(3) is given by:

$$RB=R(3)+R(4) \qquad (3),$$

according to equation (2), $$RB = (Vcc - Vc)/I(3) \qquad (4)$$
$$= (Vcc - Vc)/I(2)$$
$$= Rref$$

is satisfied. More specifically, $$Rref=R(3)+R(4) \qquad (5)$$

is satisfied. In this equation, the resistance R(4) is equal to the resistance of the ON resistor of the MOS transistor M(4).

In the second mirror circuit section 15, a configuration (combination of the MOS transistor 2 and the resistor 3 having the resistance RA) having the same shape as that of a combination of the MOS transistor M(4) and a resistor having a resistance R(3) is arranged adjacent to the first mirror circuit section 14. A voltage equal to the gate voltage of the MOS transistor M(4) is set to be the gate voltage of the MOS transistor 2. Reference symbol PAD(2) denotes an input terminal for a transmission signal of the reception-side semiconductor device, and has an AC potential which is determined by a central voltage (common voltage when a differential signal is used) of a transmission signal amplitude.

The MOS transistor M(4) and the MOS transistor 2 must be biased to a linear region. In the linear region, an ON resistance Ron of the MOS transistor 2 is given by equation (6):

$$Ron=1/(\Delta Ids/\Delta Vds)=rds \qquad (6)$$

where d is a drain, s is a source, and g is a gate.

In this manner, the terminal resistance (RA+Ron) of this embodiment is equal to the sum of resistances of the MOS transistor M(4) and the resistance R(3). More specifically, in this embodiment, the terminal resistance (RA+Ron=Z0) can be made equal to the reference resistance Rref (=Z0).

As described above, in this embodiment, since the terminal resistor is incorporated in the semiconductor device, a reduction in cost of the entire system and a reduction in substrate mounting area can be realized. Since the variations of the terminal resistances are absorbed by using the ON resistor of the MOS transistor, the impedance matching of the system can be kept at the same level as that of a conventional technique using an external resistor. In addition, only one reference resistor which is in proportion to the characteristic impedance of the transmission line is additionally attached, terminal resistors corresponding to all signals on a data bus can be adjusted to be equal to the characteristic impedance of the transmission line. Furthermore, even in a system having a characteristic impedance of a transmission line different from the above characteristic impedance, a semiconductor device need not be designed again, and the semiconductor device can cope with the different characteristic impedance by only changing the value of the reference resistor.

In the first embodiment described above, a terminal resistor is realized by a pull-up resistor. In contrast to this, in a second embodiment, the terminal resistor is realized by a pull-down resistor.

Figure 3:
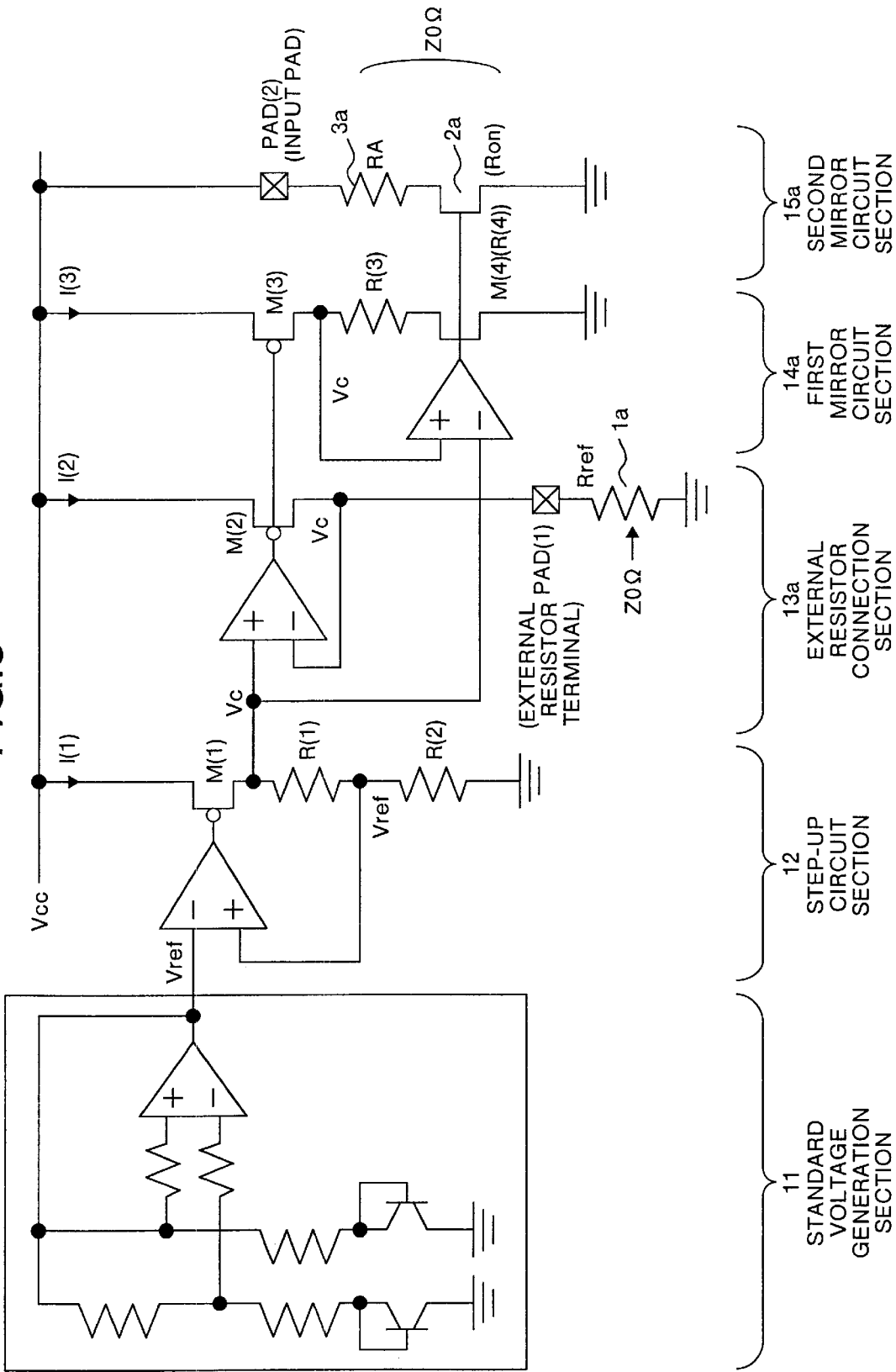
FIG. 3 is a block diagram showing the configuration of a second embodiment of the impedance adjustment circuit according to the present invention.

FIG. 3 is a block diagram showing the configuration of a second embodiment of the impedance adjustment circuit according to the present invention. In FIG. 3, reference numeral 13a denotes an external resistor connection section, reference numeral 14a denotes a first mirror circuit section, and reference numeral 15a denotes a second mirror circuit section. The same reference numerals as in the embodiment described above denote the same parts in the second embodiment, and a description thereof will be omitted.

Operation of the impedance adjustment circuit will be described below. In the external resistor connection section 13a, due to the negative feedback principle of an operational amplifier, a terminal PAD(1) is biased to the standard voltage Vc. Therefore, a current I(2) flowing in a MOS transistor M(2) is expressed by equation (7):

$$I(2)=Vc/Rref \tag{7}$$

where resistance Rref=Z0 represents a value which is in proportion to the impedance of the transmission line.

In the first mirror circuit section 14a, a voltage equal to the gate voltage of the MOS transistor M(2) is set to be a gate voltage of a MOS transistor M(3), and the MOS transistor M(3) is biased to a saturation region, so that a current I(3) flowing in the MOS transistor M(3) is equal to the current I(2).

The drain voltage of the MOS transistor M(3) is equal to the standard voltage Vc due to the negative feedback principle of the operational amplifier. Furthermore, since a resistance RB between the power supply voltage Vcc and the drain voltage of the MOS transistor M(3) is given by:

$$RB = R(3) + R(4), \tag{8}$$

$$\begin{aligned} RB &= Vc/I(3) \\ &= Vc/I(2) \\ &= Rref \end{aligned} \tag{9}$$

is satisfied. More specifically, $$Rref=R(3)+R(4) \tag{10}$$

is satisfied. In this equation, the resistance R(4) is equal to the resistance of the ON resistor of the MOS transistor M(4).

In the second mirror circuit section 15a, a configuration (combination of a MOS transistor 2a and a resistor 3a having the resistance RA) having the same shape as that of a combination of the MOS transistor M(4) and a resistor having a resistance R(3) is arranged adjacent to the first mirror circuit section 14a. A voltage equal to the gate voltage of the MOS transistor M(4) is set to be the gate voltage of the MOS transistor 2a. Reference symbol PAD(2) denotes an input terminal for a transmission signal of the reception-side semiconductor device, and has an AC potential which is determined by a central voltage (common voltage when a differential signal is used) of a transmission signal amplitude.

The MOS transistor M(4) and the MOS transistor 2 must be biased to a linear region. In the linear region, an ON resistance Ron of the of the MOS transistor 2a is given by equation (6) as in the first embodiment described above.

In this manner, the terminal resistance (RA+Ron) of this embodiment is equal to the sum of resistances of the MOS transistor M(4) and the resistance R(3). More specifically, in this embodiment, the terminal resistance (RA+Ron=Z0) can be made equal to the reference resistance Rref (=Z0).

As described above, in this embodiment, the same effect as that of the first embodiment described above, and a terminal resistor can be realized by a pull-down resistor.

In a third embodiment, a terminal resistor is realized by a pull-up resistor, and an input impedance Zin is kept constant even though the amplitude (common potential) of an input signal varies.

Figure 4:
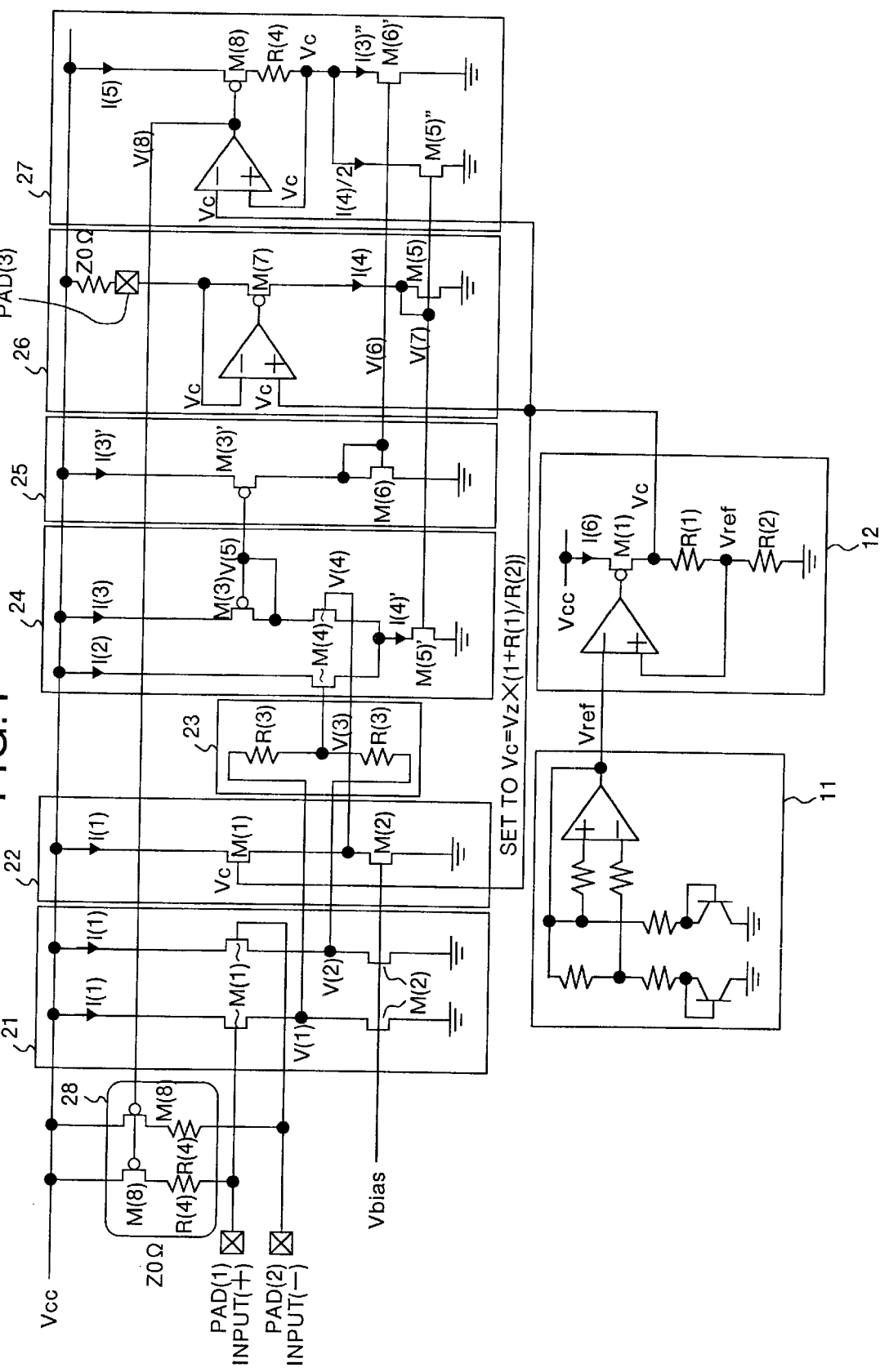
FIG. 4 is a block diagram showing the configuration of a third embodiment of the impedance adjustment circuit according to the present invention.

FIG. 4 is a block diagram showing the configuration of a third embodiment of the impedance adjustment circuit according to the present invention. In FIG. 4, reference numeral 21 denotes a first source follower amplifier, reference numeral 22 denotes a second source follower amplifier, reference numeral 23 denotes a differential common potential detection section, reference numeral 24 denotes a differential circuit section, reference numeral 25 denotes a common-side current mirror section, reference numeral 26 denotes a Z0 detection section, reference numeral 27 denotes a mirror circuit section, and reference numeral 28 denotes an input impedance section. The same reference numerals as in the first embodiment described above denote the same parts in the third embodiment, and a description thereof will be omitted.

Operation of the impedance adjustment circuit will be described below. In this embodiment, signal inputs are differential signal inputs, and a differential common potential is detected, so that a bias voltage of an input impedance is adjusted.

In the first source follower amplifier 21, the voltage levels of the differential input signals are shifted to voltages V(1) and V(2), respectively, such that the voltage levels are matched to an input range of the differential circuit section 24 (to be described later). In the second source follower amplifier 22, a standard voltage Vc received from the step-up circuit section 12 is shifted to a voltage V(4) such that the standard voltage Vc is matched to the input range of the differential circuit section 24 (to be described later). Note that, when the differential input signals satisfy typ conditions, the value of the standard voltage Vc is set such that "V(4)=Vc" is satisfied.

In the differential common potential detection section 23, in order to detect the amplitude levels of the differential input signals, a common potential V(3) is extracted from the voltages V(1) and V(2). In this case, divided voltages obtained by two resistors having equal resistances R(3) are set as the common potential V(3).

In the Z0 detection section 26, an impedance Z0 of the transmission line is detected, and a standard current I(4) of this circuit by using an external resistor (having the impedance Z0) which is in proportion to the impedance of the transmission line. More specifically, the source voltage of a MOS transistor M(7) is equal to the standard voltage Vc due to the negative feedback principle of an operational amplifier. Therefore, the standard current I(4) flowing in a MOS transistor M(5) can be expressed by equation (11):

$$I(4)=(Vcc-Vc)/Z0 \qquad (11)$$

In the differential circuit section 24, the common potential V(3) and the standard voltage Vc (corresponding to V(4)) are compared with each other, a current value corresponding to the difference between the common potential V(3) and the standard voltage Vc is extracted. That is, the current I(2) corresponding to the common potential V(3) and the current I(3) corresponding to the standard voltage Vc are extracted. More specifically, since "I(4)=I(4)'" is satisfied by making the MOS transistors M(5) and M(5)' equal to each other in size, equation (12) is satisfied:

$$I(4)'=I(2)+I(3) \qquad (12)$$

Figures 5, 6:
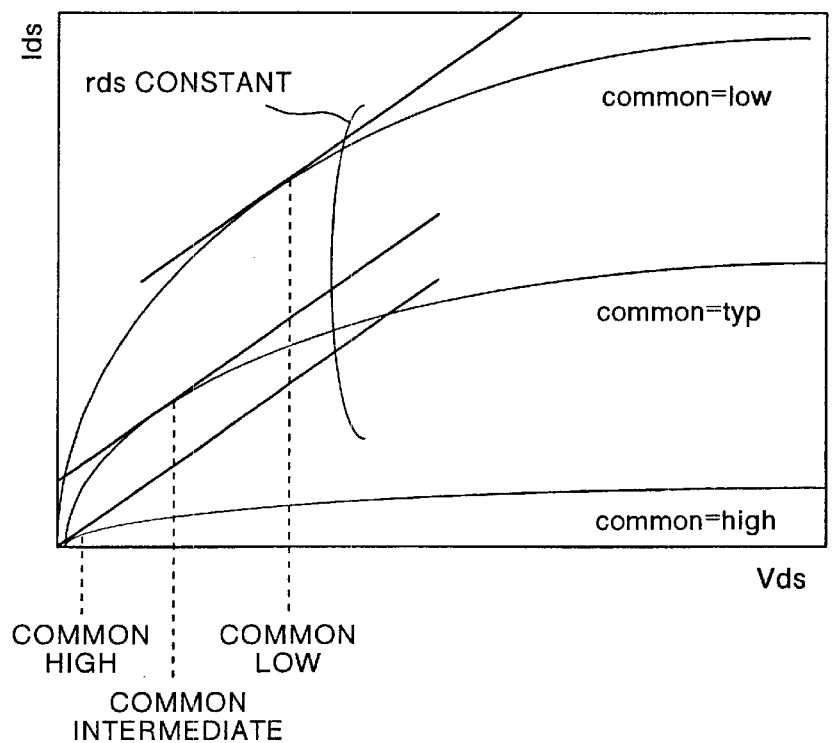
FIG. 5 is a table showing a relationship between a common potential and a reference potential.
FIG. 6 is a graph showing the manner of a variation of a bias voltage.

FIG. 5 is a table showing a relationship between the common potential V(3) and the reference potential Vc. In this case, for example, (I) when "V(3)=Vc", "I(2)=I(3)" is satisfied,
(II) when "V(3)>Vc", "I(2)>I(3)" is satisfied, and
(III) when "V(3)<Vc", "I(2)<I(3)" is satisfied.

In this state, a differential voltage ΔVin between the common potential V(3) and the standard voltage Vc and a differential current ΔIin between the current value I(2) and the current value I(3) satisfy a relationship expressed by equation (13):

$$\Delta Vin \quad \Delta Iin \qquad (13)$$

In the common-side current mirror section 25, the MOS transistors M(3) and M(3)' are made equal to each other in size, so that a current value I(3)' equal to the current value I(3) corresponding to the standard voltage Vc is flowed in the MOS transistor M(3)'.

In the mirror circuit section 27, MOS transistors M(6) and M(6)' are made equal to each other in size, so that a current value I(3)" equal to the current I(3) corresponding to the standard voltage Vc and the current I(3)' is flowed in the MOS transistor M(6)' to reflect a variation of a common potential. The size of a MOS transistor M(5)" is made ½ the size of the MOS transistor M(5), a current value I(4)/2 which is 2/1 the standard current I(4) is flowed in the MOS transistor M(5)" to reflect a variation of the impedance of the transmission line.

Therefore, in the mirror circuit section 27, a current value I(5) flowing in a MOS transistor M(8) can be expressed by equation (14):

$$I(5)=I(3)"+I(4)/2 \qquad (14)$$

The relationship between the common potential V(3) and the standard voltage Vc in the mirror circuit section 27 is shown by using FIG. 5. In this case, for example, (I) when V(3)=Vc, then I(3)"=I(4)/2 is satisfied,
(II) when V(3)>Vc, then I(3)"<I(4)/2 is satisfied, and
(III) when V(3)<Vc, then I(3)">I(4)/2 is satisfied.

When the amplitudes of the differential signal inputs, i.e., the common voltage varies, a voltage Vds of the MOS transistor M(8) varies. When the MOS transistor M(8) is used as a resistor (On resistor having a resistance rds), the MOS transistor M(8) must be biased to a linear region. However, since the MOS has quadratic characteristics, the resistance rds is influenced by a variation of the voltage Vds even in the linear region. For this reason, in the mirror circuit section 27, a bias voltage V(8) must be adjusted.

More specifically, in the mirror circuit section 27, a contact-point voltage between the resistor having the resistance R(4) and the MOS transistor M(6)' is equal to the standard voltage Vc due to the negative feedback principle of an operational amplifier, thereby adjusting the bias voltage V(8). For example, when a resistance RA between the power supply voltage Vcc and the standard voltage Vc is given by RA=Ron+R(4), then (I) the bias voltage V(8) is determined such that RA=Zin when V(3)=Vc,
(II) the bias voltage V(8) is increased such that RA>Zin when V(3)>Vc, and
(III) the bias voltage V(8) is reduced such that RA<Zin when V(3)<Vc.

FIG. 6 is a graph showing the manner of a variation of the bias voltage V(8). In FIG. 6, the gate voltage of the MOS transistor M(8) is varied by the variation of the bias voltage V(8) by a magnitude corresponding to the variation of the voltage Vds of the MOS transistor M(8), so that the resistance rds is always kept constant.

In the input impedance section 28, configurations each having the same shape as that of a combination of the MOS transistor M(8) and the resistor having the resistance R(4) are arranged on terminals PAD(1) and PAD(2), respectively. The gate voltages of the respective MOS transistors M(8) are equal to each other.

In this manner, the same effect as that obtained in the first embodiment described above can be obtained. In addition, even though the amplitudes of the differential signal inputs, i.e., the common voltage varies, the input impedance Zin (terminal resistance) can be kept constant while linking the reference resistor Rref. In particular, in a transmission system using differential signals, an input impedance can be accurately adjusted.

Figure 7:
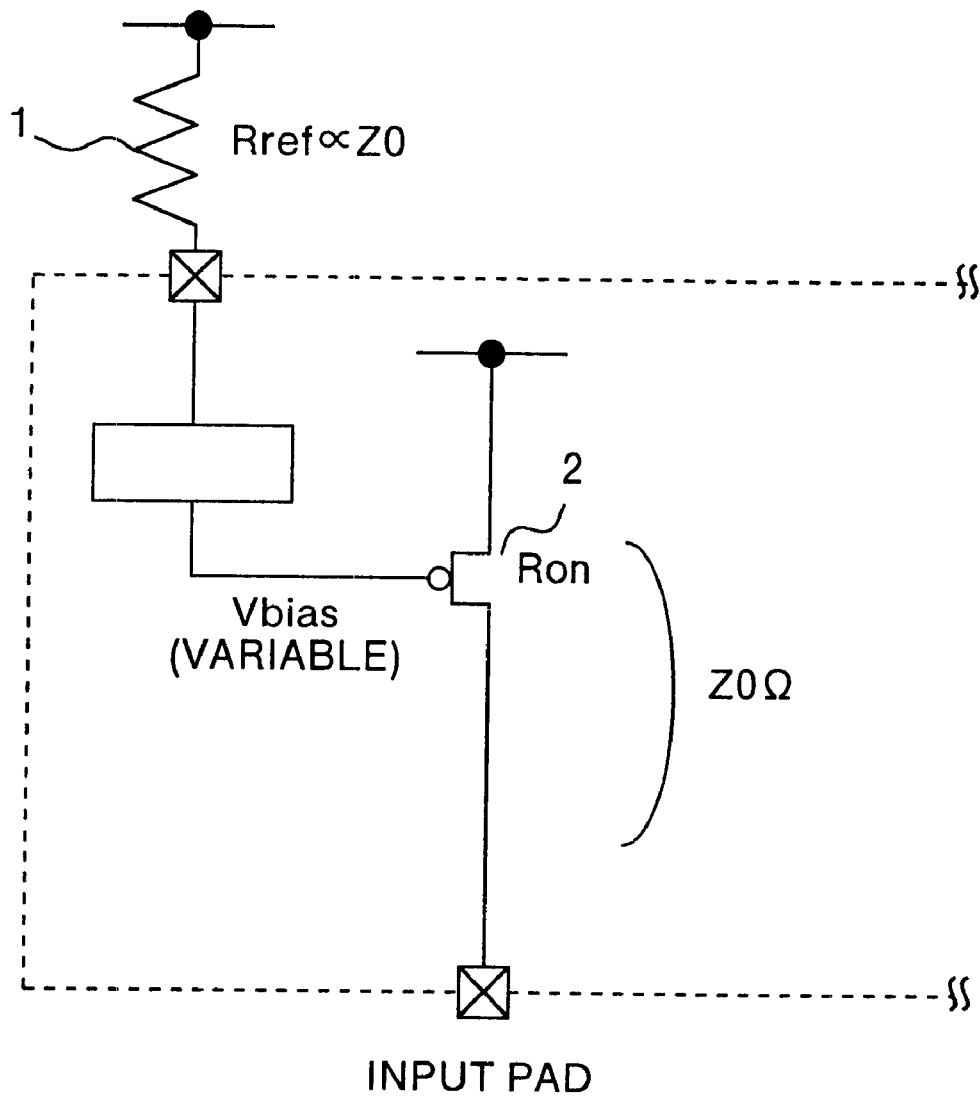
FIG. 7 is a block diagram showing the concept of the impedance adjustment circuit according to the present invention.

FIG. 7 is a block diagram showing the concept of the impedance adjustment circuit according to the present invention. In a fourth embodiment, a terminal resistor is realized by a MOS transistor 2.

Figure 8:
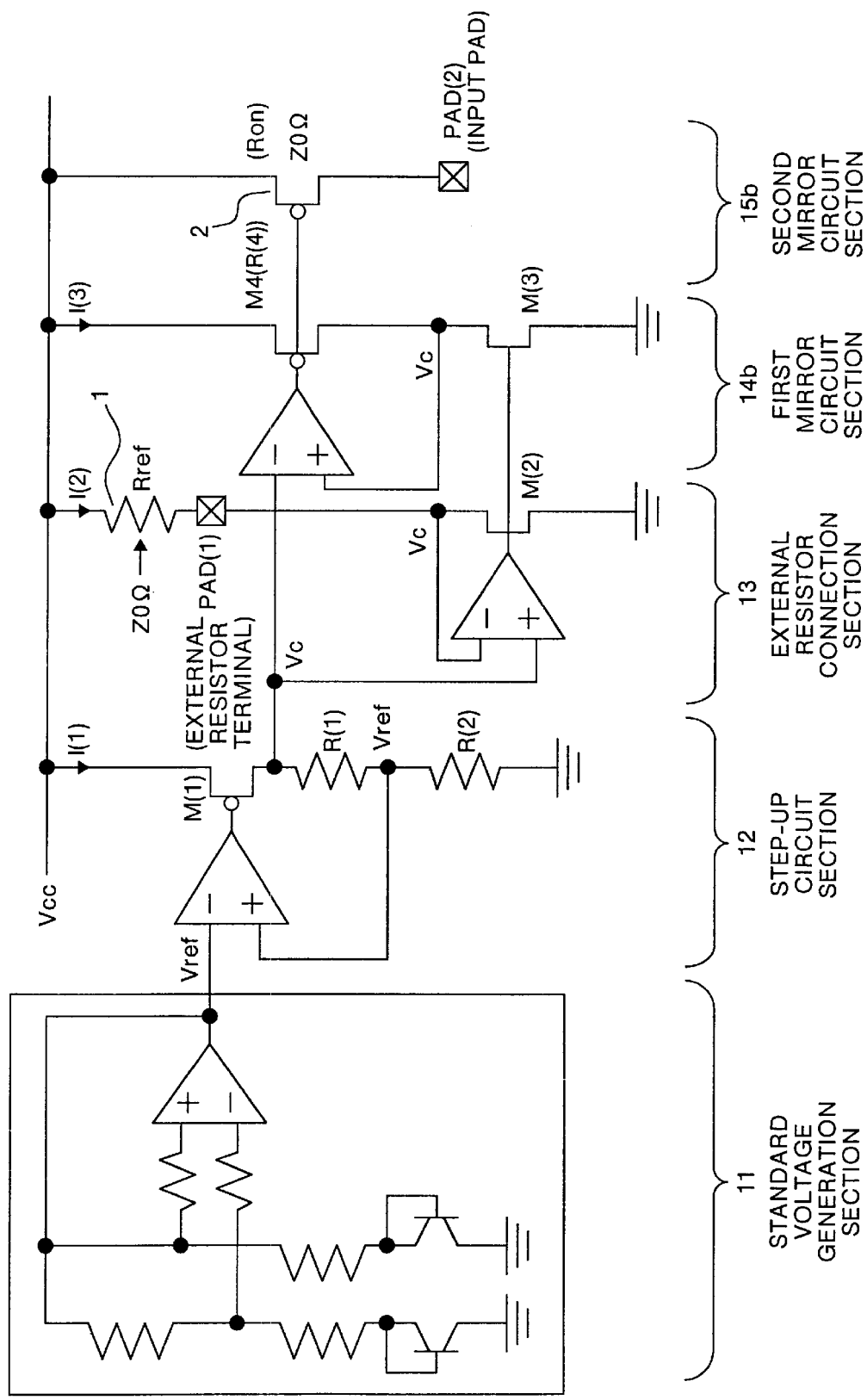
FIG. 8 is a block diagram showing the configuration of a fourth embodiment of the impedance adjustment circuit according to the present invention.

FIG. 8 is a block diagram showing the configuration of the fourth embodiment of the impedance adjustment circuit according to the present invention. Reference numeral 14b denotes a first mirror circuit section, and reference numeral 15b denotes a second mirror circuit section. The same reference numerals as in the first embodiment described above denote the same parts in the fourth embodiment, a description thereof will be omitted.

Operation of the impedance adjustment circuit will be described below. Only different points between the operation of the fourth embodiment and the operation of the first embodiment described above will be described below. In the first mirror circuit section 14b, a voltage equal to a gate voltage of a MOS transistor M(2) is set as a gate voltage of a MOS transistor M(3), and the MOS transistor M(3) is biased to a saturation region to make a current I(3) and a current I(2) flowing in the MOS transistor M(3) equal to each other.

The drain voltage of the MOS transistor M(3) is equal to a standard voltage Vc due to the negative feedback principle of an operational amplifier. Furthermore, since a resistance between a power supply voltage Vcc and a drain voltage of the MOS transistor M(3), i.e., the resistance of an ON resistor of a MOS transistor M(4) is represented by R(4), $$R5 = (Vcc/Vc)/I(3) \quad (15)$$
$$= (Vcc/Vc)/I(2)$$
$$= Rref$$

is satisfied.

In the second mirror circuit section 15b, a MOS transistor 2 having the same shape as that of the MOS transistor M(4) is arranged adjacent to the first mirror circuit section 14b. A voltage equal to the gate voltage of the MOS transistor M(4) is set to be a gate voltage of the MOS transistor 2. Reference symbol PAD(2) denotes an input terminal for a transmission signal of a reception-side semiconductor device, and has an AC potential which is determined by a central voltage (common voltage when a differential signal is used) of a transmission signal amplitude.

In this manner, a terminal resistance (Ron) of this embodiment is equal to the ON resistance of the MOS transistor M(4). More specifically, in this embodiment, the terminal resistance (Ron=Z0) and the reference resistance Rref (=Z0) can be made equal to each other.

As described above, in this embodiment, the same effect as that obtained in the first embodiment described above. Since the resistance constituting an input impedance is only the ON resistance of the MOS transistor, the mounting area of a semiconductor device can be reduced.

A fifth embodiment is a case in which the central voltage of a transmission signal amplitude is lower than Vref. In this embodiment, for the sake of descriptive convenience, a configuration will be described as an application of the first embodiment. However, this configuration can also be applied to the second embodiment to the fourth embodiment.

Figure 9:
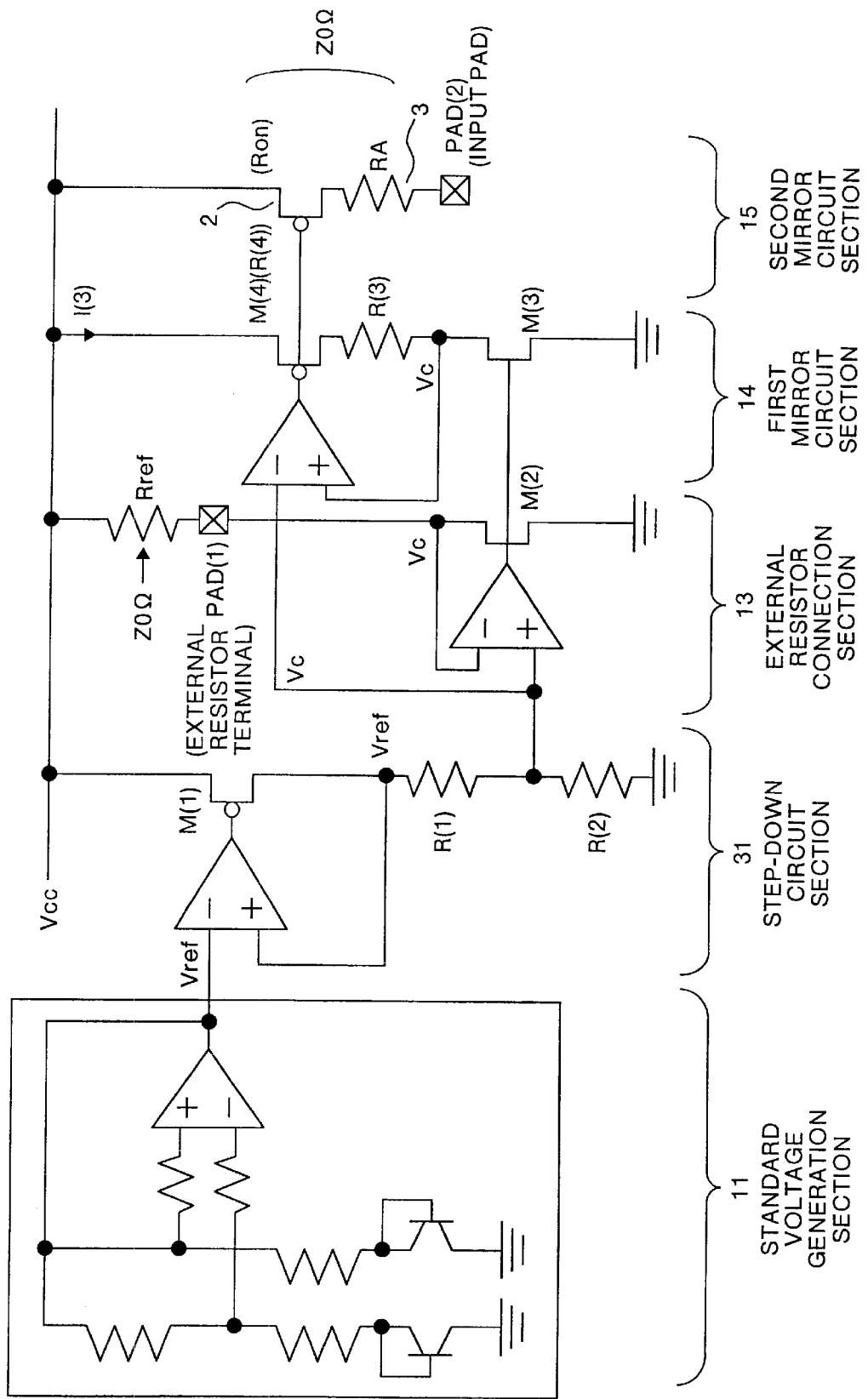
FIG. 9 is a block diagram showing the configuration of a fifth embodiment of the impedance adjustment circuit according to the present invention.
Figure 10:
FIG. 10 is a block diagram showing the configuration of a conventional data transmission system.
Figure 11:
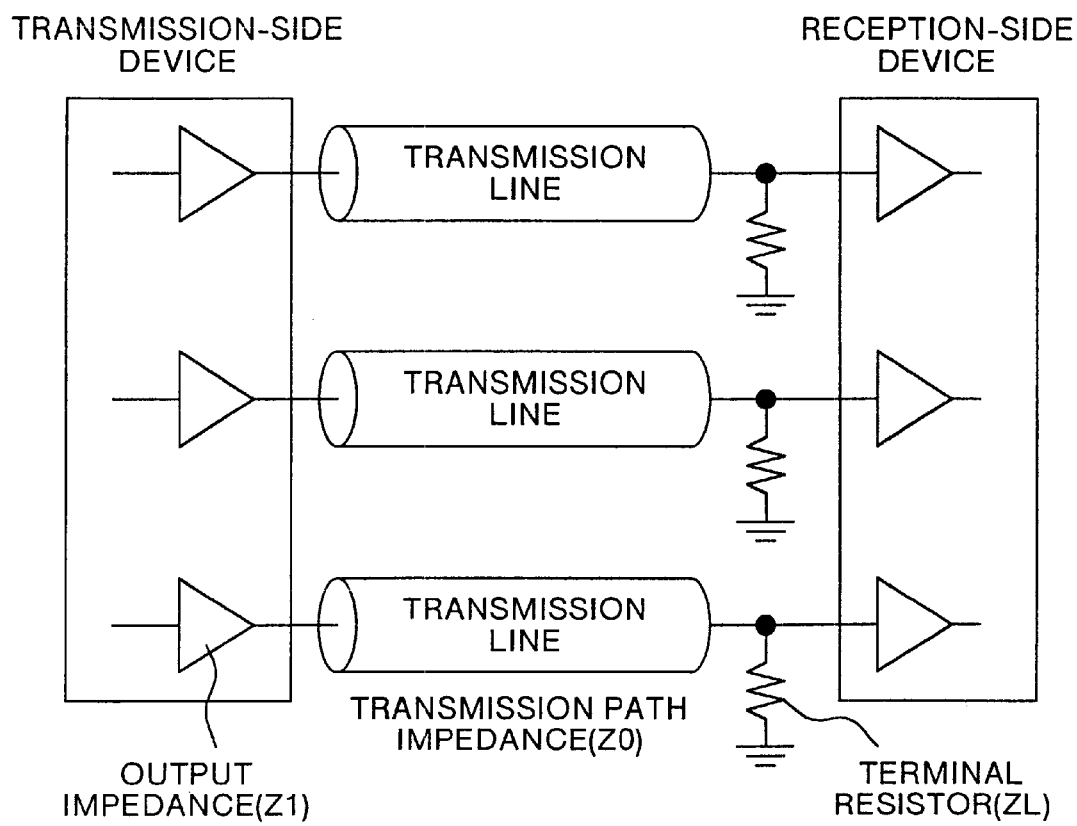
FIG. 11 is a block diagram showing the configuration a conventional data transmission system which suppresses reflection.

FIG. 9 is a block diagram showing the configuration of the fifth embodiment of the impedance adjustment circuit according to the present invention. Reference numeral 31 denotes a step-down circuit section. The same reference numerals as in the first embodiment described above denote the same parts in the fifth embodiment, and a description thereof will be omitted.

Operation of the impedance adjustment circuit will be described below. Only different points between the operation of the fifth embodiment and the operation of the first embodiment described above will be described below. In the step-up circuit section 31, a standard voltage Vc (<Vref) is generated by using an output voltage Vref of a reference voltage generation section 11. More specifically, the standard voltage Vc can be expressed by equation (16):

$$Vc = Vref/(R(1)+R(2)) \times R(1) \quad (16)$$

In this manner, the standard voltage Vc can be calculated by a ratio of a reference voltage Vref, a resistance R(1), and a resistance R(2). In a semiconductor device, since elements having the same shapes and adjacently arranged in the semiconductor device have almost equal characteristics, as is apparent from equation (1), the voltage Vc can be accurately determined like the reference voltage Vref without being influenced by a variation in power supply voltage, a variation in temperature, and a variation in manufacture.

As described above, in this embodiment, the same effect as that obtained in the first embodiment described above. Furthermore, even though the amplitude of a transmitted signal is small, an input impedance can be accurately adjusted.

In the first to fifth embodiments described above, the potential of the standard voltage Vc is set to be the central voltage (common potential when a differential signal is used) of a transmission signal amplitude, and any one of a step-up circuit section and a step-down circuit section is selectively used on the basis of the central voltage and an output voltage from the standard voltage generation section. The present invention is not limited to these embodiments, and a voltage which satisfies "Vref=Vc" may be given from an external circuit. In this manner, a standard voltage generation circuit section and the step-down circuit section (or the step-up circuit section) are not required, a circuit scale can be considerably reduced.

As has been described above, according to the present invention, a reference resistor having a resistance which is in proportion to the impedance of a transmission line is additionally attached to a reception-side semiconductor device. More specifically, the reference resistor and an internal terminal resistor are matched to each other. In order to suppress a variation of a resistor in manufacture, the terminal resistor is constituted by a resistor having a resistance and an ON resistor of a MOS transistor. More specifically, when the terminal resistor is constituted by only a resistor, since the variation of the resistance in manufacture is large, the terminal resistor is designed such that the variation is absorbed by the ON resistor of the MOS transistor. In this manner, even though the terminal resistor is incorporated in the reception-side device, a variation of the internal resistor in manufacture is absorbed, and an optimum impedance can be advantageously realized.

Furthermore, since the terminal resistor is incorporated in the semiconductor device, a reduction in cost of an entire system and a reduction in substrate mounting area can be advantageously realized. Since a variation of the terminal resistance is absorbed by using the ON resistor of the MOS transistor, impedance matching of the system can be advantageously kept at the same level as that of a conventional technique using an external resistor. Only one reference resistor which is in proportion to the characteristic impedance of the transmission line is additionally attached, terminal resistors corresponding to all signals on a data bus can be advantageously adjusted to be equal to the characteristic impedance of the transmission line. Even in a system having a characteristic impedance of a transmission line different from the above characteristic impedance, a semiconductor device need not be designed again, and the semiconductor device can advantageously cope with the different characteristic impedance by only changing the value of the reference resistor.

Furthermore, the terminal resistor can be advantageously realized by the pull-down resistor.

Furthermore, even though the amplitudes of the differential signal inputs, i.e., the common voltage varies, the input impedance (terminal resistance) can be advantageously kept constant while linking the reference resistor. In particular, in a transmission system using differential signals, an input impedance can be advantageously accurately adjusted.

Furthermore, since the reference voltage generation unit and the voltage control unit is not necessary, a circuit scale can be advantageously considerably reduced.

Moreover, according to this invention, a reference resistor having a resistance which is in proportion to the impedance of a transmission line is additionally attached to a reception-side semiconductor device. More specifically, the reference resistor and an internal terminal resistor are matched to each other. In order to suppress a variation of a resistor in manufacture, the terminal resistor is constituted by an ON resistor of a MOS transistor. In this manner, even though the terminal resistor is incorporated in the reception-side device, optimum impedance matching can be advantageously realized.

Furthermore, since the resistor constituting the input impedance is only the ON resistor, the mounting area of the semiconductor device can be advantageously considerably reduced.

Furthermore, the reference voltage generation unit and the voltage control unit are not necessary, a circuit scale can be advantageously considerably reduced.

Although the invention has been described with respect to a specific embodiment for a complete and clear disclosure, the appended claims are not to be thus limited but are to be construed as embodying all modifications and alternative constructions that may occur to one skilled in the art which fairly fall within the basic teaching herein set forth.

What is claimed is:

1. An impedance adjustment circuit comprising:
    a reception-side semiconductor device including at least one terminal resistor, said impedance adjustment circuit achieving impedance matching between said terminal resistor and a transmission line;
    a reference resistor external to said reception-side semiconductor device, said reference resistor having a first resistance which is proportional to characteristic impedance of the transmission line, wherein
        said terminal resistor has a second resistance and an ON resistance of an MOS transistor, and
        resistance of said terminal resistor is adjusted by referring to said reference resistor;
    a reference voltage generation unit which generates a reference voltage in spite of variations in power supply voltage, temperature, and manufacturing processes;
    a voltage control unit which changes the reference voltage to generate a standard voltage;
    a voltage power supply to which a first terminal of said reference resistor is connected;
    an external resistor connection unit which biases a second terminal of said reference resistor to the standard voltage to generate a standard current flowing in said reference resistor;
    a first mirror circuit unit which generates a first current equal to the standard current by using a combination of said terminal resistor having the second resistance and the ON resistance of said MOS transistor biased to operate in a linear region; and
    a second mirror circuit unit including a terminal resistor having the same configuration as the combination of said MOS transistor and said terminal resistor as a pull-up resistor of the transmission line, wherein said second mirror circuit unit generates a second current equal to the standard current and the first standard current using said terminal resistor.

2. The impedance adjustment circuit according to claim 1, wherein a voltage which satisfies "reference voltage= standard voltage" is received from an external circuit, and said reference voltage generation unit and said voltage control unit are not provided.

3. An impedance adjustment circuit comprising:
    a reception-side semiconductor device including at least one terminal resistor, said impedance adjustment circuit achieving impedance matching between said terminal resistor and a transmission line;
    a reference resistor external to said reception-side semiconductor device, said reference resistor having a first resistance which is proportional to characteristic impedance of the transmission line, wherein
        said terminal resistor has a second resistance and an ON resistance of an MOS transistor, and
        resistance of said terminal resistor is adjusted by referring to said reference resistor;
    a reference voltage generation unit which generates a reference voltage in spite of variations in power supply voltage, temperature, and manufacturing process;
    a voltage control unit which changes the reference voltage to generate a standard voltage;
    an external resistor connection unit, which biases a first terminal of said reference resistor, a second terminal of which is connected to the ground, to the standard voltage to generate a standard current flowing in said reference resistor;
    a first mirror circuit unit which generates a first current equal to the standard current by using a combination of said terminal resistor having the second resistance and the ON resistance of said MOS transistor biased to operate in a linear region; and
    a second mirror circuit unit including a terminal resistor having the same configuration as the combination of said MOS transistor and said terminal resistor as a pull-up resistor of the transmission line, wherein said second mirror circuit unit generates a second current equal to the standard current and the first standard current using said terminal resistor.

4. The impedance adjustment circuit according to claim 3, wherein a voltage which satisfies "reference voltage= standard voltage" is received from an external circuit, and said reference voltage generation unit and said voltage control unit are not provided.

5. An impedance adjustment circuit comprising:
    a reception-side semiconductor device including at least one terminal resistor, said impedance adjustment circuit achieving impedance matching between said terminal resistor and a transmission line;
    a reference resistor external to said reception-side semiconductor device, said reference resistor having a first resistance which is proportional to characteristic impedance of the transmission line, wherein
        said terminal resistor has a second resistance and an ON resistance of an MOS transistor, and
        resistance of said terminal resistor is adjusted by referring to said reference resistor;
    a reference voltage generation unit which generates a reference voltage in spite of variations in power supply voltage, temperature, and manufacturing process;
    a voltage control unit which changes the reference voltage to generate a standard voltage;
    a voltage shift unit which shifts voltage levels of differential input signals and the standard voltage to match the voltage levels and the standard voltage to an input range;
    a common potential extraction unit for extracting a common potential from the voltage levels of the differential input signals shifted by the voltage shift unit;
    a voltage power supply to which a first terminal of said reference resistor is connected;
    an external resistor connection unit which biases a second terminal of said reference resistor to the standard voltage to generate a standard current flowing in said reference resistor;
    a differential circuit unit which generates a current corresponding to the common potential and a current corresponding to the standard voltage according to the difference between the common potential and the standard voltage;

a common-side current mirror unit which generates a first current equal to the current corresponding to the reference voltage;

a mirror circuit unit which generates a second current, equal to the current corresponding to the standard voltage and the first current, for reflecting a variation of the common potential, which generates a third current that is ½ the standard current, reflecting a variation of the characteristic impedance of the transmission line, and which adjusts a bias voltage of said MOS transistor such that a combined resistance of said terminal resistor having the second resistance and the ON resistance of said MOS transistor biased to operate a linear region is constant even though the common potential and the characteristic impedance of the transmission line vary; and an input impedance circuit unit which uses a terminal resistor having the same configuration as the combination of said terminal resistor having the second resistance and said ON resistance of said MOS transistor as a pull-up resistor of the transmission line.

6. The impedance adjustment circuit according to claim 5, wherein a voltage which satisfies "reference voltage= standard voltage" is received from an external circuit, and said reference voltage generation unit and said voltage control unit are not provided.

7. An impedance adjustment circuit comprising:

a reception-side semiconductor device including at least one terminal resistor, said impedance adjustment circuit achieving impedance matching between said terminal resistor and a transmission line;

a reference resistor external to said reception-side semiconductor device, said reference resistor having a first resistance which is proportional to characteristic impedance of the transmission line, wherein said terminal resistor has an ON resistance of an MOS transistor, and resistance of said terminal resistor is adjusted by referring to said reference resistor;

a reference voltage generation unit which generates a reference voltage in spite of variations in power supply voltage, temperature, and manufacturing processes;

a voltage control unit which changes the reference voltage to generate a standard voltage;

a voltage power supply to which a first terminal of said reference resistor is connected;

an external resistor connection unit which biases a second terminal of said reference resistor to the standard voltage to generate a standard current flowing in said reference resistor;

a first mirror circuit unit which generates a first current equal to the standard current by using an ON resistance of said MOS transistor biased to operate in a linear region; and a second mirror circuit unit which uses a terminal resistor having the same configuration as said MOS transistor as a pull-up resistor of the transmission line, wherein said second mirror circuit unit generates a second current equal to the standard current and the first standard current using said terminal resistor.

8. The impedance adjustment circuit according to claim 7, wherein a voltage which satisfies "reference voltage= standard voltage" is received from an external circuit, and said reference voltage generation unit and said voltage control unit are not provided.

* * * * *